(12) United States Patent
Kitatani

(10) Patent No.: US 9,380,149 B2
(45) Date of Patent: Jun. 28, 2016

(54) PORTABLE TERMINAL DEVICE, INFORMATION PRESENTATION METHOD, AND PROGRAM

(71) Applicant: NEC CASIO MOBILE COMMUNICATIONS, LTD., Kawasaki-shi, Kanagawa (JP)

(72) Inventor: Kenichi Kitatani, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/435,352

(22) PCT Filed: Jun. 12, 2013

(86) PCT No.: PCT/JP2013/003685
§ 371 (c)(1),
(2) Date: Apr. 13, 2015

(87) PCT Pub. No.: WO2014/064862
PCT Pub. Date: May 1, 2014

(65) Prior Publication Data
US 2015/0281429 A1     Oct. 1, 2015

(30) Foreign Application Priority Data
Oct. 22, 2012    (JP) ................. 2012-232662

(51) Int. Cl.
*H04W 12/02*     (2009.01)
*H04M 1/725*     (2006.01)
(Continued)

(52) U.S. Cl.
CPC ............ *H04M 1/72577* (2013.01); *G06F 3/16* (2013.01); *G06F 21/36* (2013.01); *H04M 1/67* (2013.01);
(Continued)

(58) Field of Classification Search
CPC ... H04M 1/72577; H04W 12/06; H04W 4/14; H04W 4/12
USPC .............. 455/411, 550.1, 566, 145, 466, 221, 455/456.6, 3.06
See application file for complete search history.

(56) References Cited

U.S. PATENT DOCUMENTS 8,949,746 B2    2/2015   Marzke
9,081,479 B1    7/2015   Fram
(Continued)

FOREIGN PATENT DOCUMENTS

JP    2002-340580 A    11/2002
JP    2003-177846 A     6/2003
(Continued)

OTHER PUBLICATIONS

International Search Report for PCT Application No. PCT/JP2013/003685, mailed on Sep. 10, 2013.
(Continued)

*Primary Examiner* — Cong Tran

(57) ABSTRACT

A portable terminal device includes a display section, a display control section, an operation detection section, and an execution processing section. The display section detects an operation position and displays various objects. The display control function arranges the various objects on the screen of the display section and outputs information of an operation performed on a predetermined region. The operation detection section detects the operation performed on the predetermined region. The execution processing section executes predetermined processing according to the result of detection by the operation detection section. Accordingly, privacy of information containing a password can be enhanced.

7 Claims, 9 Drawing Sheets

(51) Int. Cl.
*H04M 1/67* (2006.01)
*G06F 21/36* (2013.01)
*G06F 3/16* (2006.01)
*H04W 12/06* (2009.01)

(52) U.S. Cl.
CPC .......... *H04M 1/72583* (2013.01); *H04W 12/02* (2013.01); *H04W 12/06* (2013.01); *H04M 2250/22* (2013.01)

(56) References Cited

U.S. PATENT DOCUMENTS

| | | |
|---|---|---|
| 2010/0100849 A1 | 4/2010 | Fram |
| 2011/0113328 A1 | 5/2011 | Marzke |
| 2011/0124376 A1* | 5/2011 | Kim ..................... G06F 1/1626 455/566 |
| 2011/0265040 A1* | 10/2011 | Shin ..................... G06F 3/0481 715/830 |

FOREIGN PATENT DOCUMENTS

| | | |
|---|---|---|
| JP | 2007-318713 A | 12/2007 |
| JP | 2009-003867 A | 1/2009 |
| JP | 2009-217815 A | 9/2009 |
| JP | 2010-263433 A | 11/2010 |
| JP | 2010-279070 A | 12/2010 |
| JP | 2012-003610 A | 1/2012 |
| JP | 2012-074870 A | 4/2012 |

OTHER PUBLICATIONS

Extended European Search Report for EP Application No. EP13849401.8 dated Apr. 20, 2016.

* cited by examiner

FIG. 3
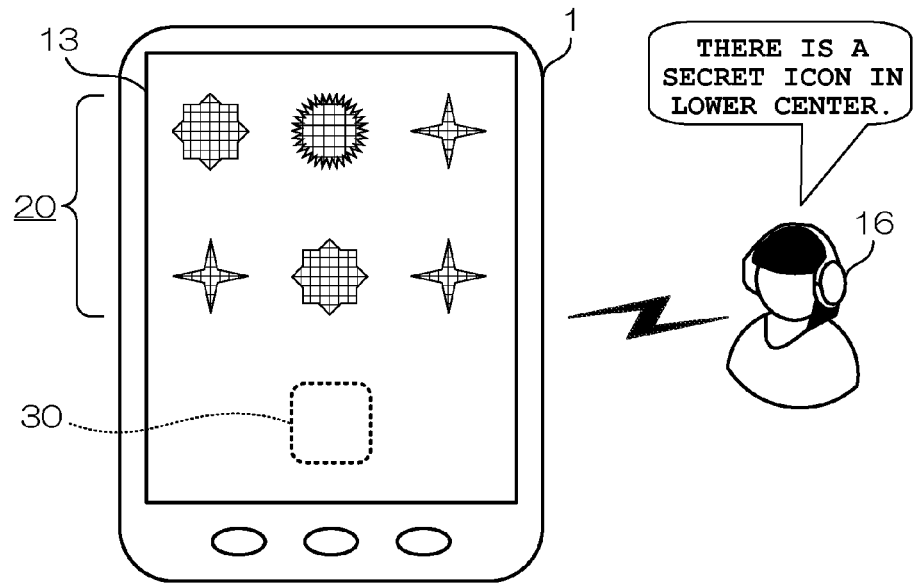
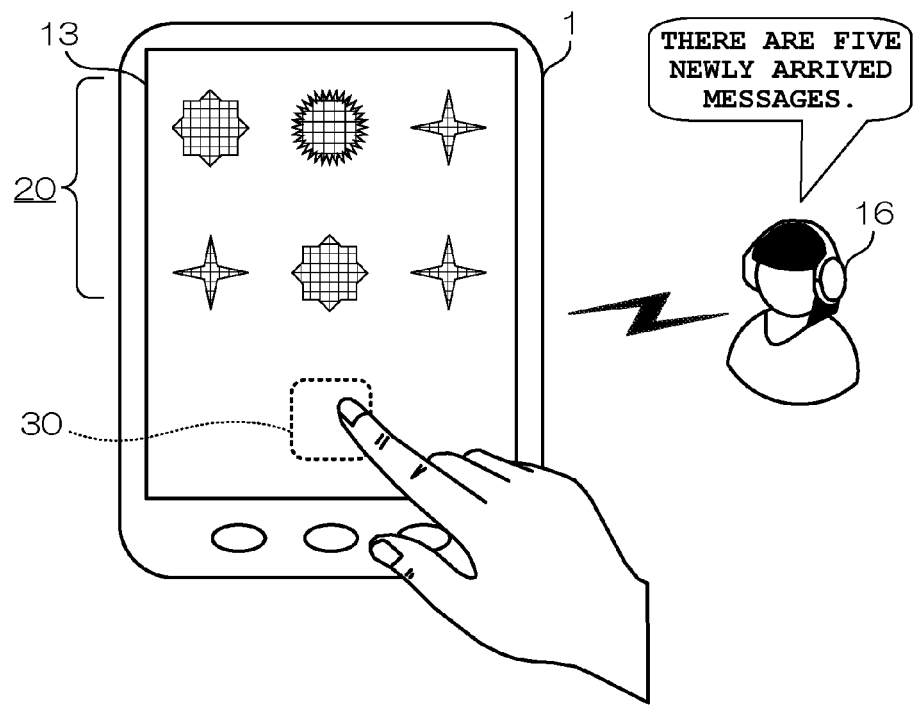

FIG. 4
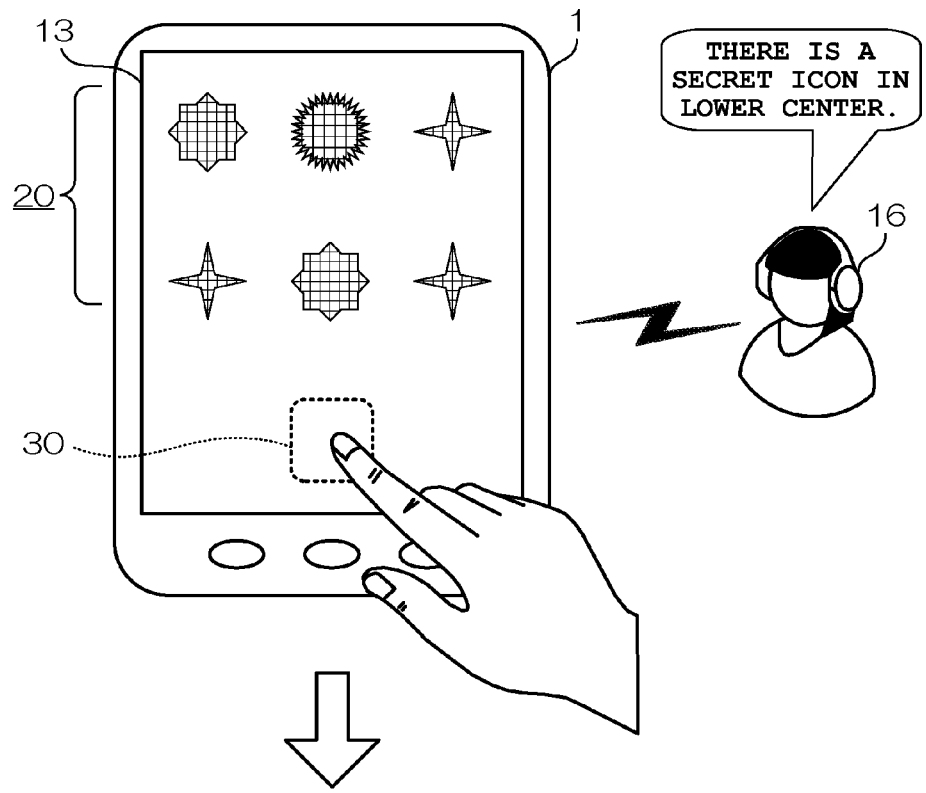
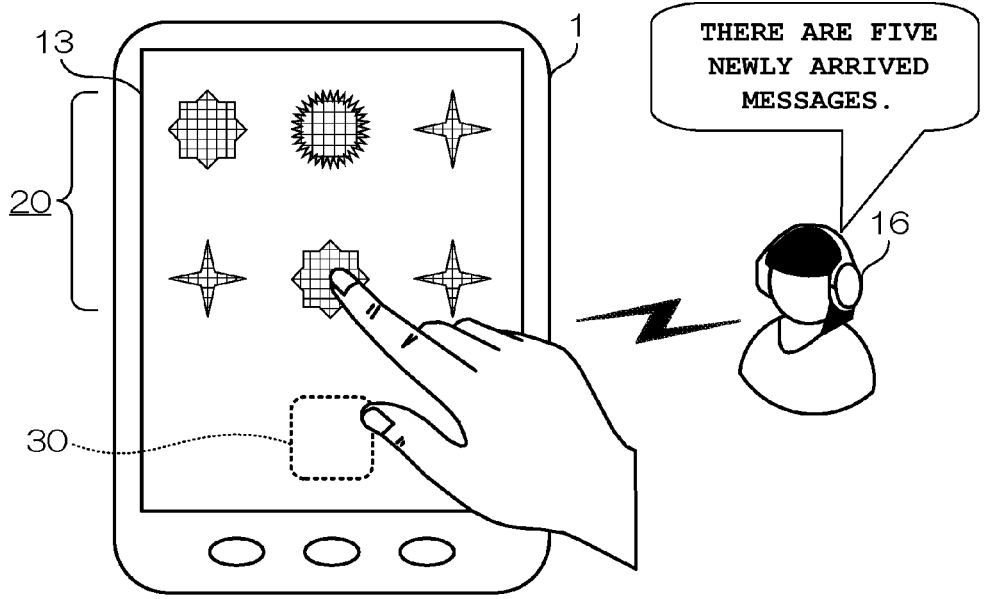

FIG. 5
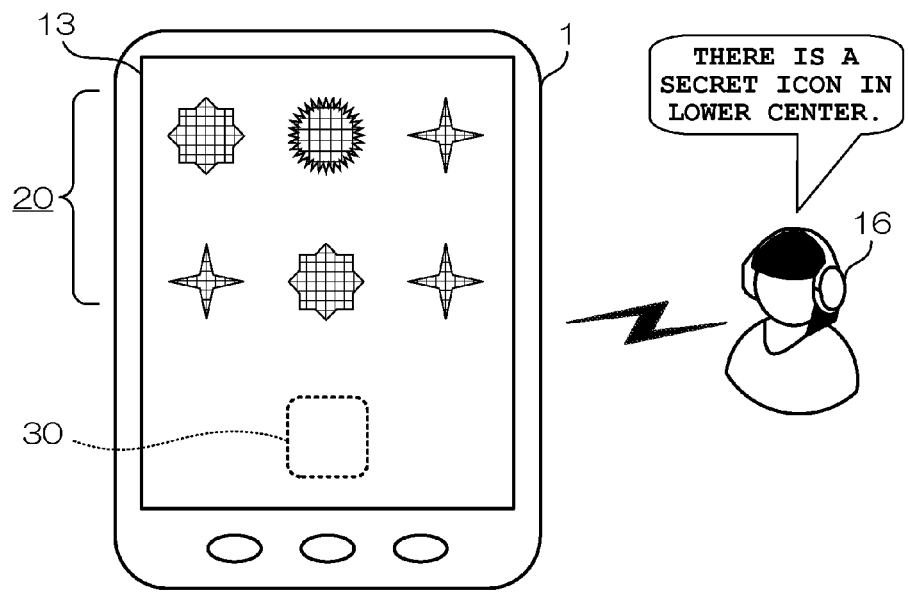
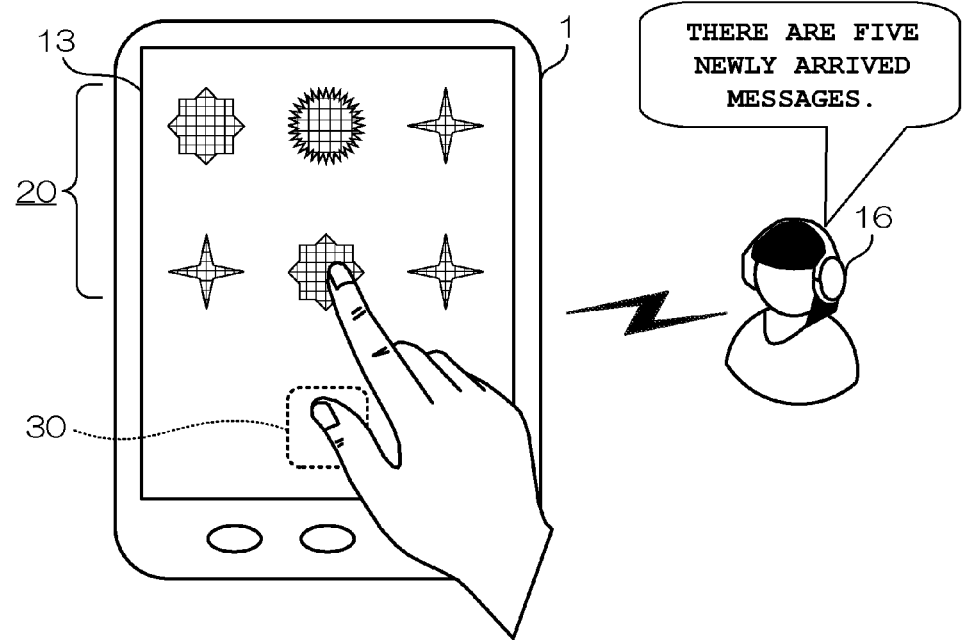

FIG. 6
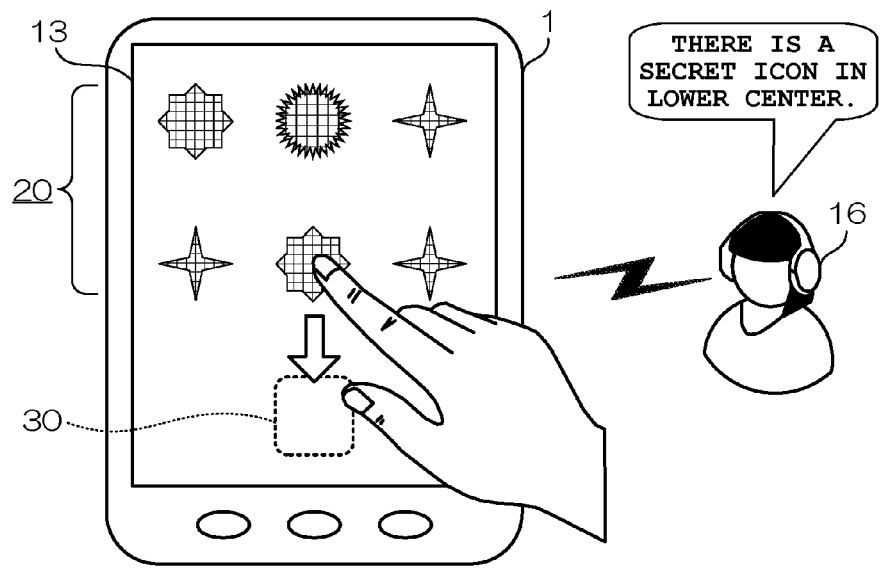
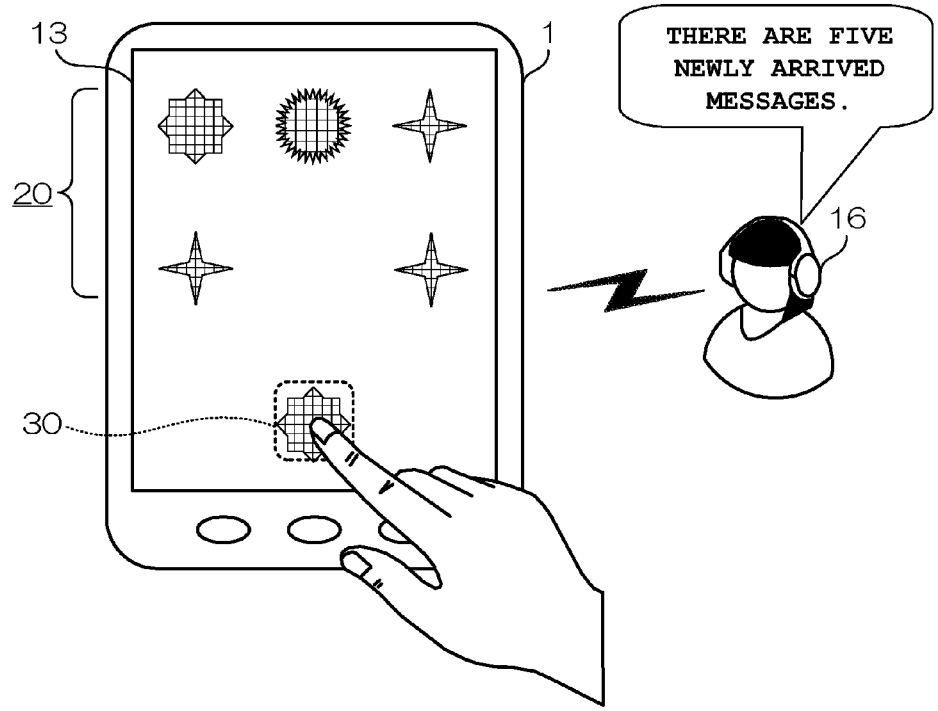

PORTABLE TERMINAL DEVICE, INFORMATION PRESENTATION METHOD, AND PROGRAM

CROSS-REFERENCE TO RELATED APPLICATIONS

This is a national stage of International Application No. PCT/JP2013/003685 filed Jun. 12, 2013, claiming priority based on Japanese Patent Application No. 2012-232662 filed Oct. 22, 2012, the entire contents of which are incorporated herein by reference.

TECHNICAL FIELD

The present invention relates to a portable terminal device, an information presentation method, and a program.

BACKGROUND ART

Conventionally, a portable terminal device, such as a smartphone or a tablet terminal, includes a display section provided with a touch panel, and is configured such that an input is made by a touch operation on the touch panel. In addition, such a portable terminal device is capable of connecting a detachable earphone for making an audio output thereto (in the case of a phone call, also including a microphone); making a phone call using a call function; and replaying and outputting a music file. For example, Patent Documents 1, 2, 3 and 4 has proposed techniques related to portable terminal devices, such as a mobile phone including a display section provided with a touch panel and a detachable earphone that makes an audio output.

In such a portable terminal device, generally, information is protected by a password etc. Information is displayed on the display section in the case where a certain password entered from the touch panel matches the password that has been registered previously.

PRIOR ART DOCUMENTS

Patent Documents

Patent Document 1: JP 2012-074870
Patent Document 2: JP 2010-279070
Patent Document 3: JP 2012-003610
Patent Document 4: JP 2010-263433

SUMMARY OF INVENTION

Problem to be Solved by the Invention

However, each of the portable terminal devices such as those disclosed in Patent Documents 1, 2, 3 and 4 described above have a problem in that, whenever a password is inputted or information is displayed on the display section, there is a high possibility that the password or information can be stolen by somebody in close proximity. Consequently, these devices are insufficient as a means for protecting information.

Thus, an object of the present invention is to provide a portable terminal device, an information presentation method, and a program, which are capable of improving the privacy of information including a password.

Means for Solving the Problem

The portable terminal device of the present invention is a portable terminal device, comprising: a display section that detects an operation position and displays various objects; a display control section that arranges the various objects on a screen of the display section and outputs information of an operation performed on a predetermined region; an operation detection section that detects the operation performed on the predetermined region; and an execution processing section that executes predetermined processing based on a result of detection by the operation detection section.

The information presentation method of the present invention is an information presentation method comprising: a step of detecting an operation position and displaying various objects on a display section; a step of arranging the various objects on a screen of the display section and outputting information of an operation performed on a predetermined region; a step of detecting the operation performed on the predetermined region; and a step of executing predetermined processing based on a result of the detection of the operation performed on the predetermined region.

The program of the present invention is a non-transitory computer-readable storage medium having a program stored thereon that is executable by a computer of a portable terminal device to actualize functions comprising: a display function that detects an operation position and displays various objects on a display section; a display control function that arranges the various objects on a screen of the display section and outputs information of an operation performed on a predetermined region; an operation detection function that detects the operation performed on the predetermined region; and an execution processing function that executes predetermined processing based on a result of detection by the operation detection function.

Effect of the Invention

According to the present invention, privacy of information containing a password can be enhanced.

BRIEF DESCRIPTION OF DRAWINGS

FIG. 3 is a schematic diagram for describing the behavior of the portable terminal device 1 and the user operation according to the first embodiment.

FIG. 4 is a schematic diagram for describing the behavior of the portable terminal device 1 and the user operation according to a first modification example of the first embodiment.

FIG. 5 is a schematic diagram for describing the behavior of the portable terminal device 1 and the user operation according to a second modification example of the first embodiment.

FIG. 6 is a schematic diagram for describing the behavior of the portable terminal device 1 and the user operation according to a third modification example of the first embodiment.

DESCRIPTION OF EMBODIMENTS

Hereinafter, embodiments of the present invention will be described with reference to the drawings.

A. First Embodiment

First, a first embodiment of the present invention will be described.

Figure 1:
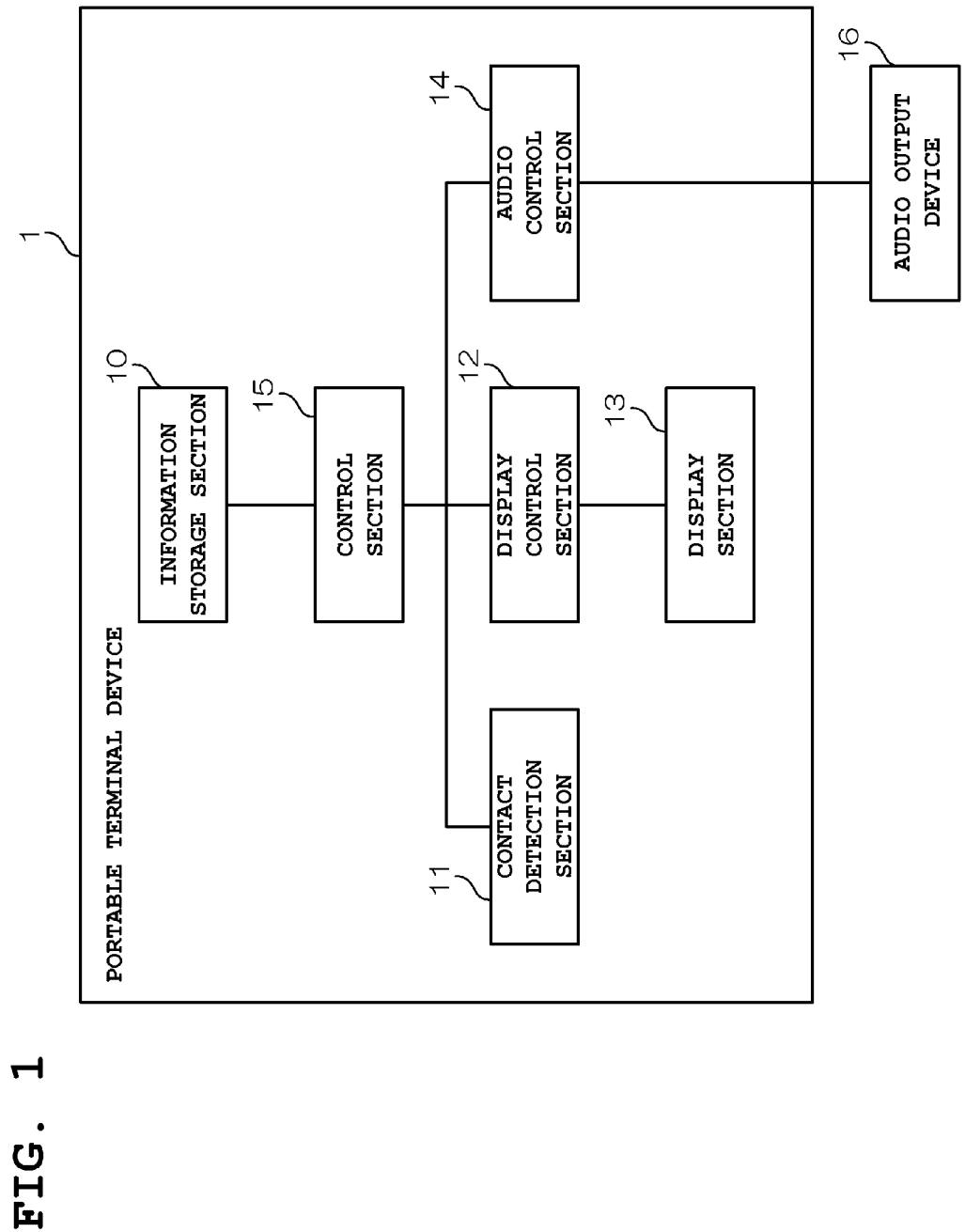
FIG. 1 is a block diagram illustrating the configuration of a portable terminal device 1 according to a first embodiment of the present invention.

FIG. 1 is a block diagram illustrating the configuration of a portable terminal device 1 according to the first embodiment of the present invention. In the diagram, the portable terminal device 1 includes an information storage section 10, a contact detection section 11, a display control section 12, a display section 13, an audio control section 14, a control section 15, and an audio output device 16.

The information storage section 10 is constituted by a rewritable non-volatile memory, such as a flash memory, and stores information related to each application. In the case of an e-mail application, for example, the address book data, e-mail texts, and the number of received e-mails are stored. The contact detection section 11 is provided on the screen of the display section 13. The contact detection section 11 detects a contact (or approach; as to approach, its description will be omitted hereinafter) by a predetermined operation tool (the user's finger, a pen, etc.) and also detects the contact position as necessary. In particular, in the first embodiment, the contact detection section 11 detects that an icon or virtual icon (described below) arranged on the display section 13 has been selected (touched) by the user.

The display control section 12 displays an icon on the display section 13 and also arranges a virtual icon, under the control of the control section 15. An icon is used to start a specific application or function. By selecting (touching) an icon, the application or function associated with the icon is started. A virtual icon is not displayed on the display section 13 and cannot be visually recognized. It is used to access information stored in the information storage section 10. Note that, although it is described herein that a virtual icon is arranged, the virtual icon does not has to be an object that is visibly displayed. That is, the virtual icon will be described as one configured as follows: a region in which a virtual icon is arranged is previously determined; and, when an operation performed on such a region is detected, an operation is performed on the arranged virtual icon. That is, a virtual icon means that, although nothing is displayed, a predetermined behavior or function is executed when the portion where the virtual icon is arranged is selected (touched). Thus, arranging a virtual icon is equivalent to establishing a region responsive to a selection (touch) operation in the arrangement portion. In addition, virtual icons and objects overlapping ordinary icons, etc., are collectively called "virtual objects".

In the first embodiment, a guidance message for providing guidance about a virtual icon (guidance that induces a contact operation on the virtual icon) (e.g., "there is a secret icon under . . . ") is notified as audio only to the user equipped with the audio output device 16 described below. Then, when the user performs a contact operation on the virtual icon (e.g., a touch operation on the virtual icon) in accordance with the guidance about the virtual icon, information stored in the information storage section 10 is outputted as audio from the audio output device 16.

The display section 13 is made up of a liquid-crystal display device, an organic EL (Electro Luminescence) display device, etc., and displays a variety of information, icons, etc., under the control of the display control section 12. The audio control section 14 performs audio signal processing on audio signals, such as the guidance message for providing guidance about a virtual icon or information read aloud with synthesized speech, etc., and outputs to the audio output device 16, under the control of the control section 15.

The control section 15 controls the behavior of each section of the portable terminal device 1 in accordance with a predetermined program. Specifically, when it is detected that the audio output device 16 has been connected, the control section 15 controls the display control section 12 such that a virtual icon for presenting information stored in the information storage section 10 is arranged on the screen of the display section 13. Then, the control section 15 controls such that a guidance message for providing guidance about the virtual icon is supplied as an audio signal to the audio control section 14 and outputted as audio from the audio output device 16.

In addition, when the contact detection section 11 detects that the virtual icon has been selected (touched) by the user, the control section 15 presents information stored in the information storage section 10 to the user. Specifically, the control section 15 reads aloud the information (text message) by synthesized speech processing, whereby the information is supplied as an audio signal to the audio control section 14 and then outputted as audio from the audio output device 16.

In addition, if the information is audio data, the audio data itself may be replayed, supplied to the audio control section 14, and outputted as audio from the audio output device 16. It is also possible that the attributes of the audio data (filename, size, file type, creation date, etc.) are read aloud with synthesized speech etc., thereby being supplied as an audio signal to the audio control section 14 and outputted as audio from the audio output device 16.

Note that, the control section 15 may be configured to authenticate whether the audio output device 16 connected is a predetermined device, and execute the series of processing described above only in the case where it is a predetermined device. In other words, the control section 15 may be configured such that, when an audio output device other than the registered audio output device 16 is connected, the series of processing described above are not executed, and the information is kept secret.

The audio output device 16 is constituted by a detachable headset or earphone, etc., and is connected to the audio control section 14 through wired connection or wireless connection using short-range wireless communication etc. The audio output device 16 outputs an audio signal from the audio control section 14, that is, a guidance message for providing guidance about a virtual icon or information read aloud with synthesized speech etc., as audio.

Next, the behavior of the first embodiment will be described.

Figure 2:
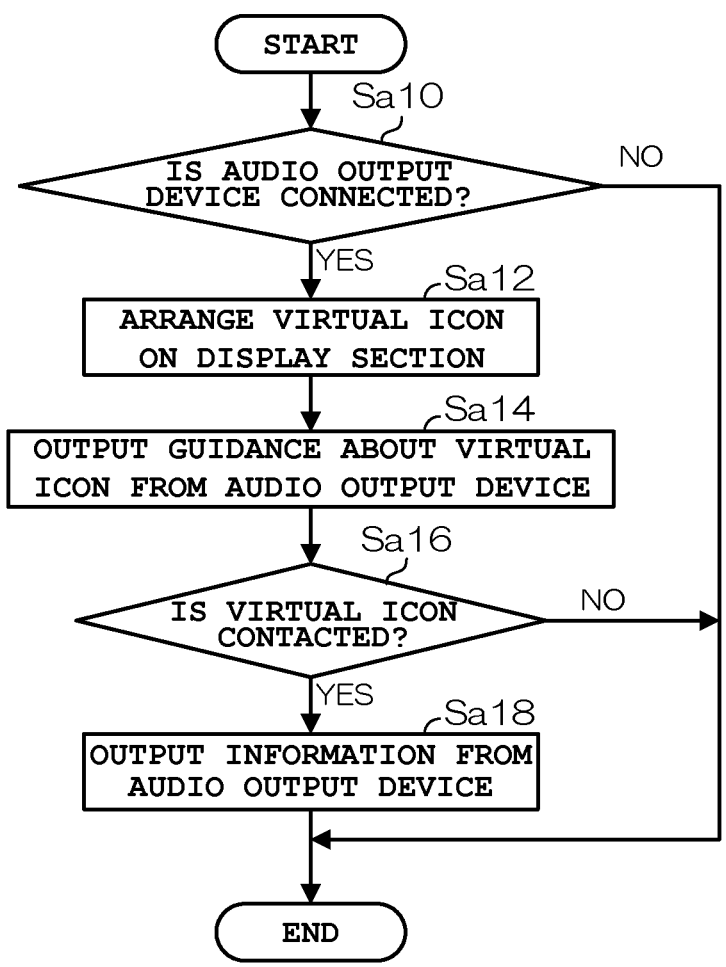
FIG. 2 is a flowchart for describing the behavior of the portable terminal device 1 according to the first embodiment.

FIG. 2 is a flowchart for describing the behavior of the portable terminal device 1 according to the first embodiment. First, the control section 15 judges whether the audio output device 16 has been connected (Step Sa10). In the case where the audio output device 16 is not connected (NO of Step Sa10), the control section 15 ends the processing. Meanwhile, in the case where the audio output device 16 is connected (YES of Step Sa10), the control section 15 controls the display control section 12 such that a virtual icon is arranged on the display section 13 (Step Sa12). The virtual icon is arranged at random each time in a position avoiding ordinary icons.

Next, the control section 15 outputs a guidance message for providing guidance about the virtual icon as audio from the audio output device 16 through the audio control section 14 (Step Sa14). For example, the guidance message "there is a secret icon under . . . " is outputted from the audio output device 16. This position of the virtual icon is notified only the user equipped with the audio output device 16, and the information is not leaked even when others are around.

Next, based on the result of detection by the contact detection section 11, the control section 15 judges whether the virtual icon has been contacted (touched) (Step Sa16). In the case where the virtual icon is not contacted (touched) (NO of Step Sa16), the control section 15 judges that the presentation of information is not required and ends the processing. Note that, in practice, the control section 15 may also be configured to end the processing in the case where the virtual icon is not contacted (touched) within a predetermined period of time after the notification of the guidance message for providing guidance about the virtual icon.

Meanwhile, in the case where the virtual icon is contacted (touched) (YES of Step Sa16), the control section 15 reads out information from the information storage section 10 and outputs the information as audio from the audio output device 16 through the audio control section 14 (Step Sa18). That is, the control section 15 reads aloud the information (text message) with synthesized speech etc., whereby the information is outputted as audio from the audio output device 16 through the audio control section 14.

In addition, if the information is audio data, the audio data itself may be replayed and outputted as audio from the audio output device 16 through the audio control section 14. It is also possible that the attributes of the audio data (file name, size, file type, creation date, etc.) are read aloud with synthesized speech etc., thereby being outputted as audio from the audio output device 16 through the audio control section 14. Then, the control section 15 ends the processing.

FIG. 3 is a schematic diagram for describing the behavior of the portable terminal device 1 and the user operation according to the first embodiment. A plurality of icons 20 are displayed on the display section 13 of the portable terminal device 1. These icons 20 are visible to the user. When it is detected that the audio output device 16 has been connected, the control section 15 arranges a virtual icon 30 for presenting information stored in the information storage section 10 on the display section 13. Then, the control section 15 outputs the guidance message "there is a secret icon in the lower center" for providing guidance about the virtual icon 30 as audio from the audio output device 16.

The user who has heard the guidance message outputted from the audio output device 16 touches the virtual icon 30 arranged on the display section 13. When the virtual icon 30 is contacted (touched), the control section 15 reads out information from the information storage section 10 and outputs the information as audio from the audio output device 16. In the example illustrated in the drawing, the user equipped with the audio output device 16 hears the information "there are five newly arrived messages" as audio.

FIG. 4 is a schematic diagram for describing the behavior of the portable terminal device 1 and the user operation according to a first modification example of the first embodiment. In the first modification example illustrated in FIG. 4, processing is the same as FIG. 3 until the arrangement of the virtual icon 30. Subsequent user operation is different in that information is not merely presented by a touch operation on the virtual icon 30. In the first modification example, the guidance message says, for example, "Please touch the secret icon in the lower center and then touch the icon of the desired application." to guide a combined contact operation on the virtual icon 30 and an ordinary icon 20.

The user who has heard the guidance message about the virtual icon 30 first touches the virtual icon 30 arranged on the display section 13, and then further performs a touch operation on an ordinary icon 20 (one of icons 20) for starting a predetermined application. If the ordinary icon 20 is an icon for starting an e-mail software, for example, information relating to the application (presence or absence of newly arrived messages, the number of newly arrived messages, etc.) is outputted as audio from the audio output device 16.

FIG. 5 is a schematic diagram for describing the behavior of the portable terminal device 1 and the user operation according to a second modification example of the first embodiment. In the second modification example illustrated in FIG. 5, processing is the same as FIG. 3 until the arrangement of the virtual icon 30. Subsequent user operation is different in that information is not merely presented by a touch operation on the virtual icon 30. In the second modification example, the guidance message says, for example, "Please simultaneously touch the secret icon in the lower center and the icon of the desired application." to guide a combined contact operation on the virtual icon 30 and an ordinary icon 20.

The user who has heard the guidance message about the virtual icon 30 multi-touches (touches two or more places, simultaneously) the virtual icon 30 arranged on the display section 13 and the icon 20 (one of ions 20) corresponding to the application the information relating to which the user wants to listen to. If the ordinary icon 20 is an icon for starting an e-mail software, for example, the information relating to the application (presence or absence of newly arrived messages, the number of newly arrived messages, etc.) is outputted as audio from the audio output device 16.

FIG. 6 is a schematic diagram for describing the behavior of the portable terminal device 1 and the user operation according to a third modification example of the first embodiment. In the third modification example illustrated in FIG. 6, processing is the same as FIG. 3 until the arrangement of the virtual icon 30. Subsequent user operation is different in that information is not merely presented by a touch operation on the virtual icon 30. In the third modification example, the guidance message says, for example, "Please drag the icon of the desired application to the position of the secret icon in the lower center." to guide a combined contact operation on the virtual icon 30 and an ordinary icon 20.

The user who has heard the guidance message about the virtual icon 30 touches the icon 20 (one of icons 20) corresponding to the application the information relating to which the user wants to listen to, and moves (drugs) the icon 20 to the position of the virtual icon 30 arranged on the display section 13 in a state where the icon is being touched. If the ordinary icon 20 is an icon for starting an e-mail software, for example, information relating to the application (presence or absence of newly arrived messages, the number of newly arrived messages, etc.) is outputted as audio from the audio output device 16. The example illustrated in the drawing shows the output of the newly arrived message "there are five newly arrived messages" as audio. Note that, the icon 20 moved to the position of the virtual icon 30 returns to its original position when the user's finger is released.

According to the first embodiment described above, when detected that a touch operation has been performed on the virtual icon 30 equipped with the audio output device 16 that only the user knows, information is presented as audio only to the user equipped with the audio output device 16. Consequently, there is no need to enter a password and information containing a password can be prevented from being stolen by a bystander in close proximity.

In addition, according to the first modification example to third modification example of the first embodiment described above, when detected that a combined operation has been performed on the virtual icon 30 and the icon 20 corresponding to an ordinary application, the information of the application corresponding to the icon 20 is presented as audio only to the user equipped with the audio output device 16. Consequently, the information of the application selected by the user containing a password can be prevented from being stolen by a bystander in close proximity.

B. Second Embodiment

Next, a second embodiment of the present invention will be described.

The second embodiment is characterized in that a confirmation message for asking whether information may be outputted from the display section 13 is outputted as audio from the audio output device 16, and, in the case where the user who has heard the message performs a predetermined operation, information stored in the information storage section 10 is displayed on the display section 13. Note that, the configuration of the portable terminal device 1 is similar to those of the first embodiment described above, and therefore the descriptions thereof are omitted.

Figure 7:
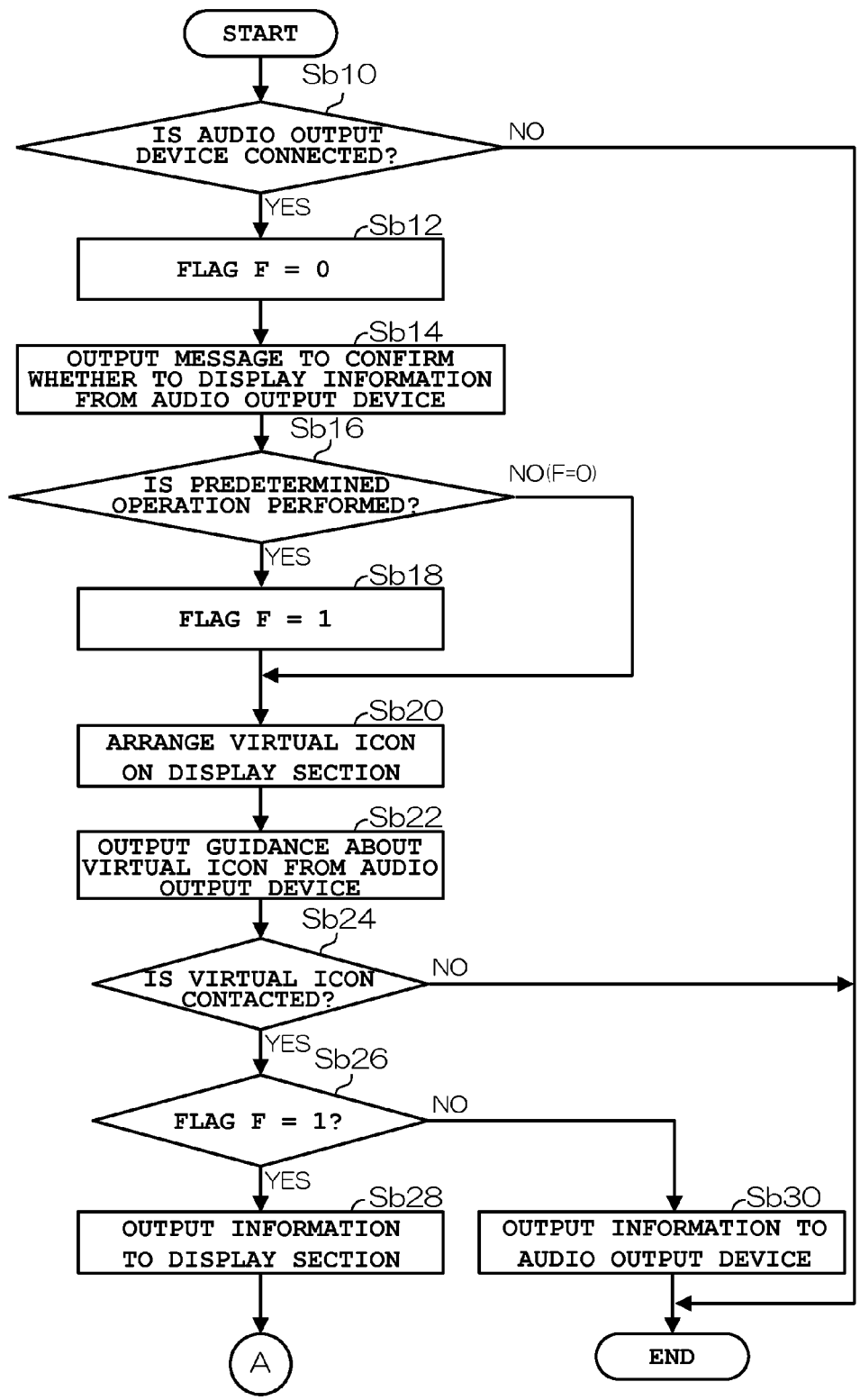
FIG. 7 is a flowchart for describing the behavior of a portable terminal device 1 according to a second embodiment.
Figure 8:
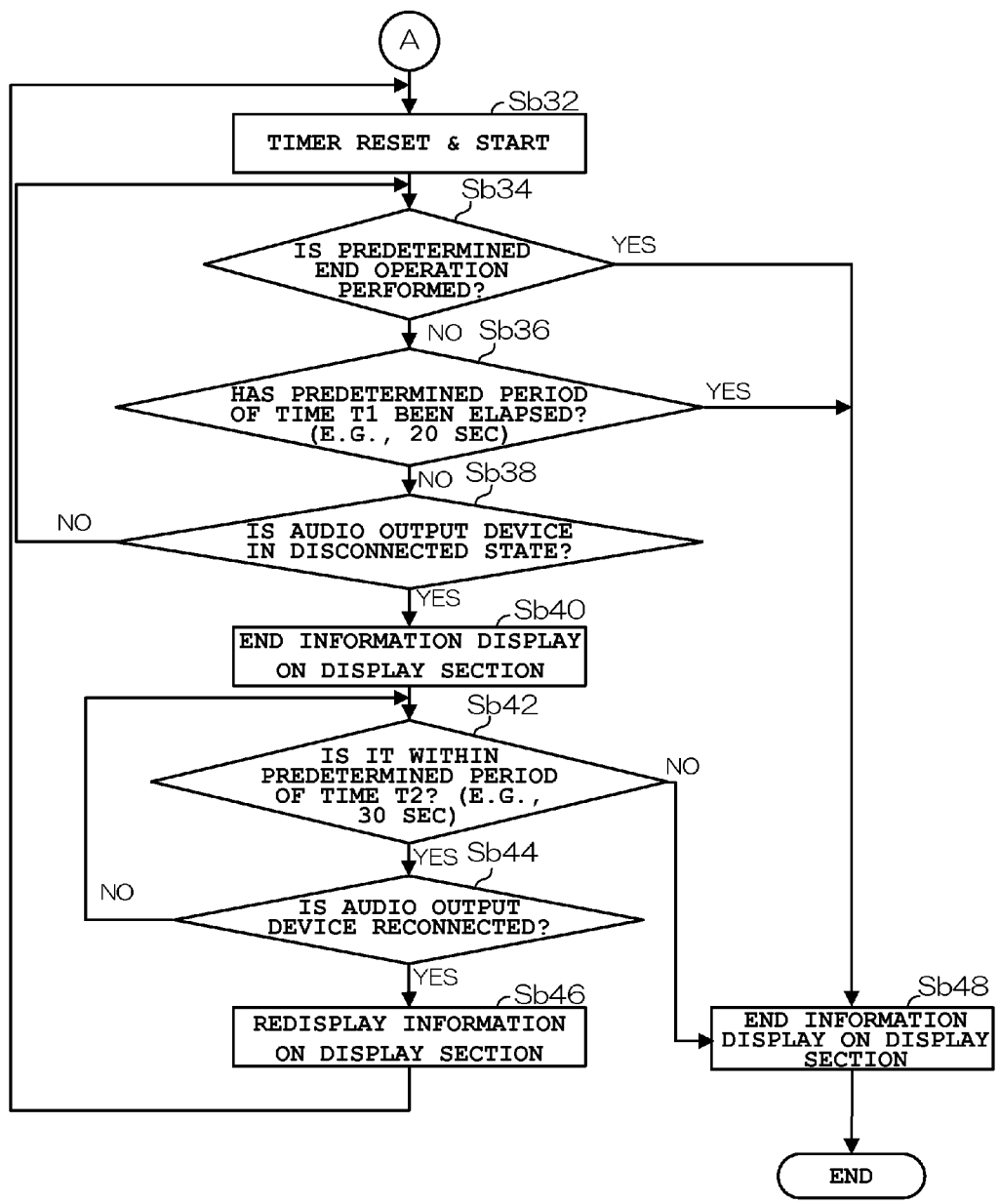
FIG. 8 is a flowchart for describing the behavior of the portable terminal device 1 according to the second embodiment.

FIG. 7 and FIG. 8 are flowcharts for describing the behavior of the portable terminal device 1 according to the second embodiment. First, the control section 15 judges whether the audio output device 16 has been connected (Step Sb10). In the case where the audio output device 16 is not connected (NO of Step Sb10), the control section 15 ends the processing.

Meanwhile, in the case where the audio output device 16 is connected (YES of Step Sb10), the control section 15 resets the flag F to "0" (Step Sb12). The flag F is a flag that indicates whether information should be outputted to the display section 13 or outputted to the audio output device 16.

Next, the control section 15 outputs a confirmation message for asking whether information may be displayed on the display section 13 as audio from the audio output device 16 through the audio control section 14 (Step Sb14). The message to confirm whether to display information may be, for example, "Please perform a predetermined operation in the case where the information is to be displayed on the display section.", etc.

Note that a predetermined operation set by the user in advance, for example, may be as follows:

(a) a predetermined sound is pronounced by the user;

(b) a predetermined contact operation (or approach operation) is performed; and (c) a predetermined key operation is performed.

Then, in the case where the user performs the predetermined operation (YES of Step Sb16), the control section 15 sets the flag F=1 (Step Sb18). Meanwhile, in the case where the user does not perform the predetermined operation (NO of Step Sb16), the control section 15 leaves the flag F=0. Note that, for the judgment of whether the predetermined operation has been performed, a condition that the predetermined operation is performed within a predetermined period of time may be added. That is, in the case where the predetermined operation is performed within a predetermined period of time after the output of the message to confirm whether to display information from the audio output device 16, the control section 15 sets the flag F=1; and, in the case where the predetermined operation is not performed within the predetermined period of time, the control section 15 leaves the flag F=0.

Next, the control section 15 controls the display control section 12 such that a virtual icon is arranged on the display section 13 (Step Sb20). The virtual icon is arranged at random each time in a position avoiding ordinary icons.

Next, the control section 15 outputs a guidance message for providing guidance about the virtual icon as audio from the audio output device 16 through the audio control section 14 (Step Sb22). For example, the guidance message "There is a secret icon under . . . " is outputted from the audio output device 16. This position of the virtual icon is notified to only the user equipped with the audio output device 16, and the information is not leaked even when others are around.

Next, based on the result of detection by the contact detection section 11, the control section 15 judges whether the virtual icon has been contacted (touched) (Step Sb24). In the case where the virtual icon is not contacted (touched) (NO of Step Sb24), the control section 15 judges that the presentation of information is not required and ends the processing. Note that, in practice, the control section 15 may also be configured to end the processing in the case where the virtual icon is not contacted (touched) within a predetermined period of time after the arrangement of the virtual icon and the notification thereof.

Meanwhile, in the case where the virtual icon is contacted (touched) (YES of Step Sb24), the control section 15 judges whether or not the flag F is "1" (the flag F=1) (Step Sb26). Then, in the case of the flag F=1 (YES of Step Sb26), the control section 15 reads out information from the information storage section 10 and displays the information on the display section 13 through the display control section 12 (Step Sb28).

Meanwhile, in the case of the flag F=0 (NO of Step Sb26), the control section 15 reads out information from the information storage section 10 and outputs the information as audio from the audio output device 16 through the audio control section 14 (Step Sb30). That is, the control section 15 reads aloud the information (text message) with synthesized speech etc., whereby the information is outputted as audio from the audio output device 16 through the audio control section 14. In this case, the control section 15 ends the processing after the audio output.

Meanwhile, when the information is displayed on the display section 13, the control section 15 resets a timer that is not illustrated, and starts a clock (Step Sb32 of FIG. 8). Next, the control section 15 judges whether a predetermined end operation has been performed by the user (Step Sb34). The predetermined end operation may be, for example, a touch operation on an icon 20 displayed on the display section 13 for instructing to end the display of information, or a predetermined key operation.

Then, in the case where the predetermined end operation is performed (YES of Step Sb34), the control section 15 ends the display of information on the display section 13 (Step Sb48), and ends the processing. That is, the control section 15 ends the processing by deleting the information displayed on the display section.

Meanwhile, in the case where the predetermined end operation is not performed (NO of Step Sb34), based on the clock of the timer, the control section 15 judges whether a predetermined period of time T1 (e.g., 20 seconds) has elapsed (Step Sb36). The predetermined period of time T1 is the time that has elapsed since the start of information display on the display section 13 in Step Sb28.

Then, in the case where the predetermined period of time T1 (e.g., 20 seconds) has elapsed since the start of information display on the display section 13 (YES of Step Sb36), the control section 15 ends the display of information on the display section 13 (Step Sb48), and ends the processing. That is, the control section 15 ends the processing by deleting the information displayed on the display section 13.

Meanwhile, in the case where the predetermined period of time T1 (e.g., 20 seconds) has not elapsed since the start of information display on the display section 13 (NO of Step Sb36), the control section 15 judges whether the audio output device 16 is in a disconnected state, that is, whether the audio output device 16 has been removed (Step Sb38). Then, in the case where the audio output device 16 is not removed (NO of Step Sb38), the control section 15 returns to Step Sb34, repeating the processing described above.

That is, in the case where the predetermined period of time T1 (e.g., 20 seconds) has elapsed since the start of information display on the display section 13 or the predetermined end operation is performed, the control section 15 ends the information display on the display section 13, and ends the processing. That is, the control section 15 ends the processing by deleting the information displayed on the display section 13.

Whereas, in the case where the predetermined end operation is not performed after the start of information display on the display section 13, and also the audio output device 16 is removed within the predetermined period of time T1 (e.g., 20 seconds) (YES of Step Sb38), the control section 15 ends the information display on the display section 13 (Step Sb40).

That is, in the case where, with the information being displayed on the display section 13, a predetermined end operation is not performed and the audio output device 16 is removed within the predetermined period of time T1 (e.g., 20 seconds), the control section 15 temporarily ends the information display on the display section 13. That is, the control section 15 temporarily deletes the information displayed on the display section 13.

Next, based on the clock of the timer, the control section 15 judges whether the elapsed time is within a predetermined period of time T2 (e.g., 30 seconds) (Step Sb42). Then, in the case where the elapsed time that has elapsed since the deletion of information display on the display section 13 is not within the predetermined period of time T2 (e.g., 30 seconds) (Step Sb42), that is, in the case where the elapsed time exceeds the predetermined period of time T2 (e.g., 30 seconds) (NO of Step Sb42), the control section 15 ends the processing as it is.

That is, in the case where, with the information being displayed on the display section 13, a predetermined end operation is not performed and the audio output device 16 is removed within the predetermined period of time T1 (e.g., 20 seconds), the control section 15 temporarily deletes the information displayed on the display section 13b. Then, further, in the case where the audio output device 16 is not reconnected within the predetermined period of time T2 (e.g., 30 seconds), the control section 15 ends the processing with the information being deleted.

Meanwhile, in the case where the elapsed time that has elapsed since the deletion of information display on the display section 13 is within the predetermined period of time T2 (e.g., 30 seconds) (YES of Step Sb42), the control section judges whether the audio output device 16 has been reconnected (Step Sb44). Then, in the case where the audio output device 16 is not reconnected (NO of Step Sb44), the control section 15 returns to Step Sb42, repeating the processing described above. Then, in the case where the audio output device 16 is reconnected within the predetermined period of time T2 (e.g., 30 seconds) (Step YES of Sb44), the control section 15 redisplays the temporarily deleted information on the display section 13 (Step Sb46). And then, the control section 15 returns to Step Sb32, repeating the processing described above.

That is, in the case where, after the start of information display on the display section 13, a predetermined end operation is not performed, the audio output device 16 is removed within the predetermined period of time T1 (e.g., 20 seconds), and further the audio output device 16 is reconnected within the predetermined period of time T2 (e.g., 30 seconds), the control section 15 redisplays the temporarily deleted information on the display section 13. After this, the control section 15 repeats the above Steps Sb32 to Sb48.

Note that, in the case where, after the audio output device 16 becomes in a disconnected state, the audio output device 16 becomes in a connected state again within the predetermined period of time T2, the control section 15 presents the previously presented information again. However, it is also possible that the control section 15 presents the previously presented information as a menu, or returns to Step Sb10 and resumes the guidance of information.

In addition, in the same manner as the first modification example to third modification example of the first embodiment described above, the second embodiment may also be configured such that, when a combined operation is performed on the virtual icon 30 and the icon 20 corresponding to an ordinary application, the information of the application corresponding to the icon 20 is presented.

According to the second embodiment described above, since information is displayed on the display section 13 in the case where the user judges that there are no other persons in close proximity and there is no possibility that the information may be stolen, information containing a password can be easily checked without being observed by a third party who is in close proximity.

Note that, the present invention can be applied to any electronic device as long as it is an electronic device provided with a touch panel, and can be widely applied to a smartphone, a tablet terminal, a stationary information processing device (personal computer), a digital camera, etc. In addition, in the present invention, the information is presented as audio in the case where a predetermined contact operation is performed on a virtual icon. However, it is also possible that biometric authentication to authenticate an individual user (fingerprint authentication, voiceprint authentication, retinal scan authentication, etc.) is performed prior to the series of processing.

This application claims the priority based on Japanese Patent Application No. 2012-232662 filed on Oct. 22, 2012, the disclosures of which are all incorporated herein.

Hereinafter, the characteristics of the present invention will be additionally described.

A part or all of the above-described embodiment can be described as described in the following Supplementary Notes; however, the embodiment is not limited to the Supplementary Notes.

(Supplementary Note 1)

Figure 9:
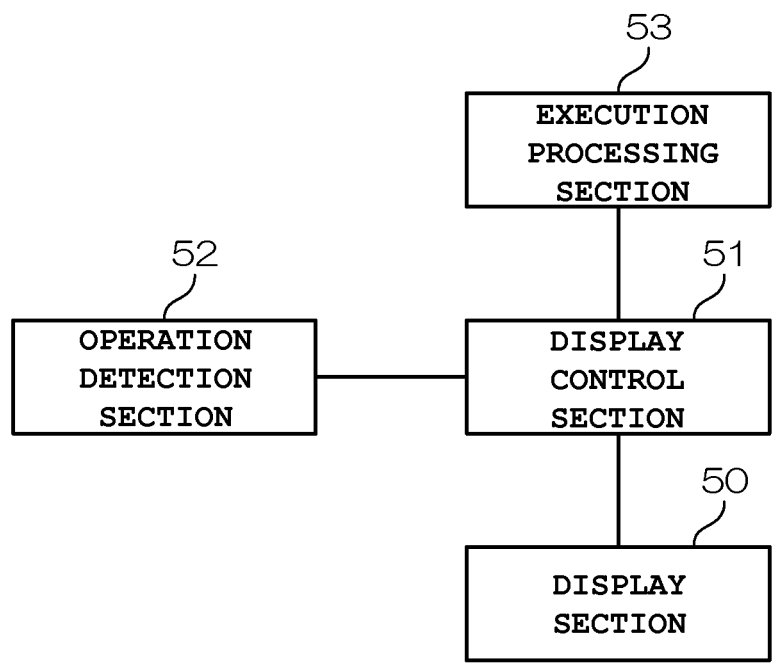
FIG. 9 is a configuration diagram of Supplementary Note 1.

FIG. 9 is a configuration diagram of Supplementary Note 1. As illustrated in this drawing, the invention described in Supplementary Note 1 is a portable terminal device, comprising: a display section 50 that detects an operation position and displays various objects; a display control section 51 that arranges the various objects on a screen of the display section 50 and outputs information of an operation performed on a predetermined region; an operation detection section 52 that detects the operation performed on the predetermined region; and an execution processing section 53 that executes predetermined processing based on a result of detection by the operation detection section 52.

(Supplementary Note 2)

Supplementary Note 2 is the portable terminal device according to Supplementary Note 1, further comprising: an audio output device that outputs audio, wherein the execution processing section outputs information associated with the predetermined region as audio from the audio output device.

(Supplementary Note 3)

Supplementary Note 3 is the portable terminal device according to Supplementary Note 1, further comprising: an audio output device that outputs audio; and a guidance section that guides an operation performed on the predetermined region as audio from the audio output device.

(Supplementary Note 4)

Supplementary Note 4 is the portable terminal device according to Supplementary Note 2, wherein the guidance section outputs a confirmation message that confirms whether the information associated with the predetermined region is allowed to be displayed on the display section as audio from the audio output device, and wherein, after the guidance section has output the confirmation message as audio, the execution processing section displays the information associated with the predetermined region on the display section when an operation performed on the predetermined region is detected by the operation detection section.

(Supplementary Note 5)

Supplementary Note 5 is the portable terminal device according to Supplementary Note 4, wherein, in the case where a predetermined period of time T1 has elapsed with the information being displayed on the display section, the execution processing section deletes the information displayed on the display section.

(Supplementary Note 6)

Supplementary Note 6 is the portable terminal device according to Supplementary Note 4, wherein the audio output device is detachable from the portable terminal device, and, wherein, in the case where the audio output device becomes in a disconnected state with the information being displayed on the display section, the execution processing section deletes the information displayed on the display section.

(Supplementary Note 7)

Supplementary Note 7 is the portable terminal device according to Supplementary Note 6, wherein, in the case where, after the audio output device becomes in the disconnected state, the audio output device becomes in a connected state again within a predetermined period of time T2, the execution processing section redisplays the information on the display section.

(Supplementary Note 8)

Supplementary Note 8 is an information presentation method comprising: a step of detecting an operation position and displaying various objects on a display section; a step of arranging the various objects on a screen of the display section and outputting information of an operation performed on a predetermined region; a step of detecting the operation performed on the predetermined region; and a step of executing predetermined processing based on a result of the detection of the operation performed on the predetermined region.

(Supplementary Note 9)

Supplementary Note 9 is a non-transitory computer-readable storage medium having a program stored thereon that is executable by a computer of a portable terminal device to actualize functions comprising: a display function that detects an operation position and displays various objects on a display section; a display control function that arranges the various objects on a screen of the display section and outputs information of an operation performed on a predetermined region; an operation detection function that detects the operation performed on the predetermined region; and an execution processing function that executes predetermined processing based on a result of detection by the operation detection function.

(Supplementary Note 10)

Supplementary Note 10 is the portable terminal device according to Supplementary Note 1, wherein the operation performed on the predetermined region is a contact operation or an approach operation on the predetermined region.

(Supplementary Note 11)

Supplementary Note 11 is the portable terminal device according to Supplementary Note 10, wherein the operation performed on the predetermined region is a contact operation or an approach operation on the predetermined region, and a contact operation or an approach operation on a visible object subsequent thereto.

(Supplementary Note 12)

Supplementary Note 12 is the portable terminal device according to Supplementary Note 10, wherein the operation performed on the predetermined region is a contact operation or an approach operation simultaneously performed on the predetermined region and a visible icon.

DESCRIPTION OF REFERENCE NUMERALS 1 portable terminal device
10 information storage section
11 contact detection section
12 display control section
13 display section
14 audio control section
15 control section
16 audio output device

What is claimed is:

1. A portable terminal device, comprising:
a display section that detects an operation position and displays various objects;
a display control section that arranges the various objects on a screen of the display section and outputs information of an operation performed on a predetermined region;
an operation detection section that detects the operation performed on the predetermined region;
an execution processing section that executes predetermined processing based on a result of detection by the operation detection section;
an audio output device that outputs audio; and
a guidance section that guides an operation performed on the predetermined region as audio from the audio output device,
wherein the guidance section outputs a confirmation message that confirms whether the information associated with the predetermined region is allowed to be displayed on the display section as audio from the audio output device, and
wherein, after the guidance section has output the confirmation message as audio, the execution processing section displays the information associated with the predetermined region on the display section when an operation performed on the predetermined region is detected by the operation detection section.

2. The portable terminal device according to claim 1, wherein the execution processing section outputs information associated with the predetermined region as audio from the audio output device.

3. The portable terminal device according to claim 1, wherein, in the case where a predetermined period of time T1 has elapsed with the information being displayed on the display section, the execution processing section deletes the information displayed on the display section.

4. The portable terminal device according to claim 1, wherein the audio output device is detachable from the portable terminal device, and, wherein, in the case where the audio output device becomes in a disconnected state with the information being displayed on the display section, the execution processing section deletes the information displayed on the display section.

5. The portable terminal device according to claim 4, wherein, in the case where, after the audio output device becomes in the disconnected state, the audio output device becomes in a connected state again within a predetermined period of time T2, the execution processing section redisplays the information on the display section.

6. An information presentation method comprising:

detecting an operation position and displaying various objects on a display section;

arranging the various objects on a screen of the display section and outputting information of an operation performed on a predetermined region;

detecting the operation performed on the predetermined region;

executing predetermined processing based on a result of the detection of the operation performed on the predetermined region;

outputting audio from an audio output device; and guiding an operation performed on the predetermined region as audio from the audio output device, wherein a confirmation message that confirms whether the information associated with the predetermined region is allowed to be displayed on the display section is outputted as audio from the audio output device, and wherein, after the confirmation message as audio has been outputted, the information associated with the predetermined region is displayed on the display section when an operation performed on the predetermined region is detected.

7. A non-transitory computer-readable storage medium having a program stored thereon that is executable by a computer of a portable terminal device to actualize functions comprising:

a display function that detects an operation position and displays various objects on a display section;

a display control function that arranges the various objects on a screen of the display section and outputs information of an operation performed on a predetermined region;

an operation detection function that detects the operation performed on the predetermined region;

an execution processing function that executes predetermined processing based on a result of detection by the operation detection function;

an audio output function that outputs audio from an audio output device; and a guidance function that guides an operation performed on the predetermined region as audio from the audio output device, wherein the guidance function outputs a confirmation message that confirms whether the information associated with the predetermined region is allowed to be displayed on the display section as audio from the audio output device, and wherein, after the guidance function has output the confirmation message as audio, the execution processing function displays the information associated with the predetermined region on the display section when an operation performed on the predetermined region is detected by the operation detection function.

\* \* \* \* \*